Sept. 13, 1955  D. K. MARTIN ET AL  2,717,621

KEY HOLDER

Filed Feb. 15, 1952

INVENTORS.
Daniel K. Martin & Daniel J. Martin
BY Wm. H. Dean
Agent

United States Patent Office 2,717,621
Patented Sept. 13, 1955

2,717,621
KEY HOLDER

Daniel K. Martin and Daniel J. Martin, San Diego, Calif.

Application February 15, 1952, Serial No. 271,724

3 Claims. (Cl. 150—40)

Our invention relates to a key holder, more particularly for use in maintaining a key or a plurality of keys properly encased so that they may conveniently be carried and the objects of our invention are:

First, to provide a key holder of this class which is made entirely of soft flexible material and which does not employ any hardware externally thereof which would cause damage or injury to a person's pocket or other articles constantly contacted thereby.

Second, to provide a key holder of this class which is entirely constructed of soft flexible material and is therefore incapable of damaging various features of the instrument panel of an automobile adjacent to the ignition key switch.

Third, to provide a key holder of this class having a single piece of soft flexible material provided with interlocking tab portions which efficiently and securely maintain keys within the holder.

Fourth, to provide a key holder of this class which is adapted to enclose keys therein, preventing the pivotal extension of the keys therefrom.

Fifth, to provide a key holder of this class having interlocking tab portions which are readily and easily connected whereby a key may be readily installed therein or removed therefrom.

Sixth, to provide a key holder of this class having the entire exterior portions thereof constructed of soft flexible material and Seventh, to provide a key holder of this class which is very simple and economical of construction, efficient in operation and which will not readily deteriorate or get out of order.

With these and other objects in view as will appear hereafter our invention consists of certain novel features of construction, combination and arrangement of parts and portions as will be hereinafter described in detail and particularly set forth in the appended claims. Reference being had to the accompanying drawings and to the characters of reference thereon forming a part of this application in which:

Similar characters of reference refer to similar parts and portions throughout the several views of the drawings.

Figure 1:
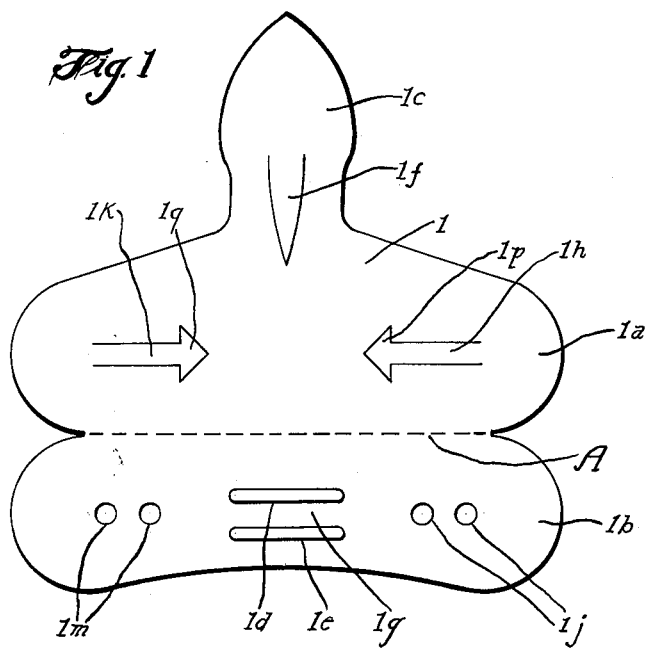
Figure 1 is a side elevational view of our key holder shown in flat open position.
Figure 2:
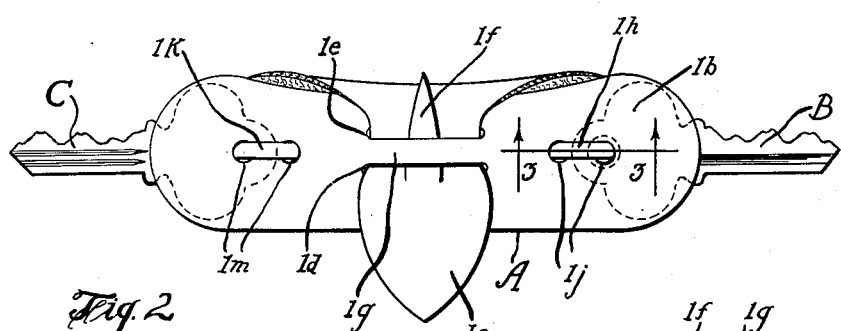
Figure 2 is a side elevational view of our key holder shown in closed position and showing the plurality of keys held therein.
Figure 3:
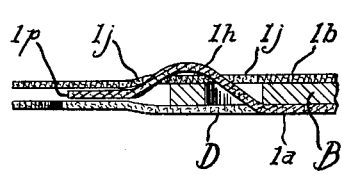
Figure 3 is an enlarged fragmentary sectional view taken from the line 3—3 of Fig. 2
Figure 4:
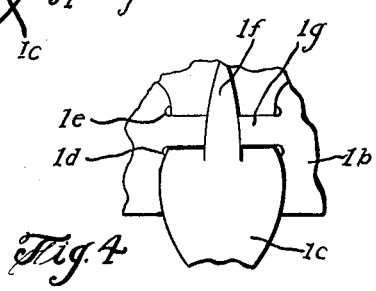
Figure 4 is a similar view to Fig. 2 showing the cover locking tab of the holder in closed locked position.

As shown in Fig. 1 of the drawings, our key case is formed of a single piece of material which comprises the body 1 or our key holder. This body 1 is provided with two side portions 1a and 1b foldable along the dash line A into the position as shown in Fig. 2 of the drawings wherein the integral extending tab 1c on the side portion 1a is extendable through slots 1d and 1e in the side portion 1b. The tab 1c is provided with an integral tongue portion 1f which is adapted to interlock with the strip of material 1g intermediate the slots 1d and 1e shown in Fig. 4 of the drawings. The side portion 1a is provided with integral arrow shaped interlocking straps 1h and 1k which are insertable through the pairs of holes 1j and 1m respectively. These arrow shaped straps 1h and 1k are provided with head portions 1p and 1q respectively which are larger than the openings 1j and 1m all as shown best in Fig. 1 of the drawings. Openings 1j and 1m may be round, oval, oblong, or merely slots. As shown in Figs. 2 and 3 of the drawings the keys B and C are interposed between the side portions 1a and 1b of the holder and the tab 1c encloses sides 1a and 1b opposite the folded portion A. Referring to Fig. 3 of the drawings it will be seen that the key B is interposed between the side portions 1a and 1b and the strap portion 1h is extended through the hole D in the key B and extends outwardly to the outer side of the side portion 1b through one of the holes 1j and extends backwardly through the other of the holes 1j to the inner side of the side member 1b wherein the head portion 1p of the arrow shaped strap 1h is interlocked by means of it's larger dimensional proportions relative to the opening 1j. Thus, our key holder which may be constructed of any flexible material such as leather or plastic which presents soft flexible surfaces throughout its entirety and does not require the use of hardware in maintaining the same in closed position.

It should be noted that applicant may use a single-ended key holder comprising tab 1c, tongue 1f, strip 1g together with a single key holding portion such as arrow 1k, and opening 1m.

The operation of our key holder is substantially as follows: When the keys B and C are held intermediate the side portions 1a and 1b by means of the arrow shaped straps 1h and 1k inserted through the holes 1j and 1m the tab 1c may be withdrawn from the slots 1d and 1e in order to permit the pivotal movement of the keys B and C into position intermediate the side portions 1a and 1b whereupon subsequent positioning of the tab 1c through the slots 1d and 1e retains the keys completely within the boundaries of the side portions 1a and 1b. If desired, the tongue 1f may be interlocked with the strap portion 1g intermediate the slots 1d and 1e for positively locking the keys B and C intermediate the side wall portions 1a and 1b. The arrow shaped straps 1h and 1k at their head portions 1p and 1q being larger than the diameter of the holes 1j and 1m prevent the retraction of these strap portions 1h and 1k from the holes 1j and 1m by tension of the keys B and C on these strap portions 1h and 1k.

It will be noted that the soft flexible character of our key holder which does not employ any hardware protects the pockets of the owner from wear by engagement of the keys therewith and also protects the various features of a motor vehicle surrounding the ignition key during operation thereof.

Though we have shown and described a particular construction, combination and arrangement of part and portions and a certain combination, we do not wish to be limited to this particular construction, combination and arrangement, but desire to include in the scope of our invention the construction, combination and arrangement substantially as set forth in the appended claims.

Having thus described our invention what we claim as new and desire to secure by Letters Patent is:

1. A key holder, said key holder comprising a single section of flexible material, said section being folded to form a pair of opposed flexible side portions, one of said side portions having a strap portion provided with an enlarged end, the other of said side portions having aperture means therein adapted to receive said strap portion, said aperture means being smaller than the enlarged portion of said strap portion whereby said strap portion may be extended through the opening in a conventional key intermediate said side portions, and the end portion of said strap portion may be interlocked in the aperture means for retaining the key intermediate said side portions, one of said side portions having a tab extending from one edge opposite the integral connection of said side portions, the other of said side portions having slot means adapted to receive said tab, and said tab having an integral tongue adapted to engage said other side portion for locking said tab thereon.

2. A key holder, said key holder comprising a single section of flexible material, said section being folded to form a pair of opposed flexible side portions, one of said side portions having a strap portion provided with an enlarged end, the other of said side portions having apertures therein adapted to receive said strap portion, said apertures being smaller than the enlarged portion of said strap portion whereby said strap portion may be extended through the opening in a conventional key intermediate said side portions, and the end portion of said strap portion may be interlocked in the apertures for retaining the key intermediate said side portions, one of said side portions having a tab extending from one edge opposite the integral connection of said side portions, the other of said side portions having slot means adapted to receive said tab, said tab having a tongue adapted to engage said other side portion for locking said tab thereon, and said slot means comprising two parallel slots, said tongue being unitary with said tab and engageable with a strap portion of said other side portion intermediate said slots.

3. A key holder, said key holder comprising a single section of flexible material, said section being folded to form a pair of opposed flexible side portions, one of said side portions having a strap unitary therewith and provided with an enlarged end, the other of said side portions having a pair of apertures therein smaller in diameter than the enlarged end of said strap portion, said strap portion extending through one of said apertures to the outside of the other of said side portions and backwardly through the other of said apertures into the inner side of said other of said side portions, whereby the eye of a key may be engaged by said strap portion intermediate said side portions.

References Cited in the file of this patent

UNITED STATES PATENTS

| | | |
|---|---|---|
| 45,848 | Morris | Jan. 10, 1865 |
| 1,652,251 | Oliver et al. | Dec. 13, 1927 |
| 1,857,336 | Sherwood | May 10, 1932 |
| 2,091,662 | Umansky | Aug. 31, 1937 |
| 2,360,077 | Sherwood | Oct. 10, 1944 |
| 2,434,121 | Pence | Jan. 6, 1948 |
| 2,496,174 | Pence | Jan. 31, 1950 |
| 2,513,135 | Barber | June 27, 1950 |
| 2,556,310 | Whitmer | June 12, 1951 |